March 22, 1960  W. R. FOX  2,929,616
DROOP CONTROL FOR GOVERNOR MECHANISM
Filed June 25, 1956
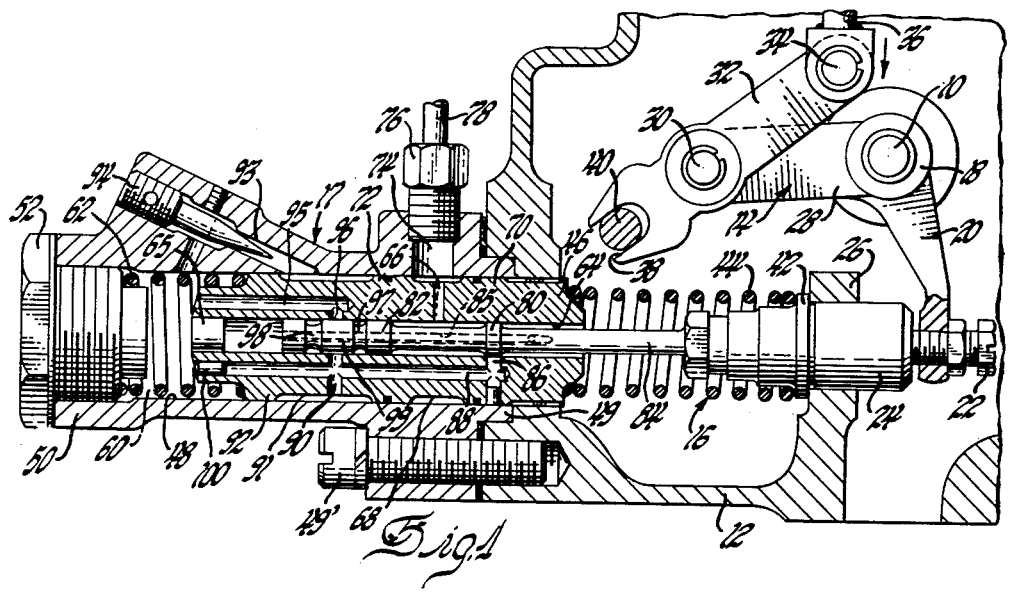
Inventor
William R. Fox
By J. C. Thorpe
Attorney

United States Patent Office 2,929,616
Patented Mar. 22, 1960

2,929,616

DROOP CONTROL FOR GOVERNOR MECHANISM

William R. Fox, Wayne, Mich., assignor to General Motors Corporation, Detroit, Mich., a corporation of Delaware Application June 25, 1956, Serial No. 593,594

22 Claims. (Cl. 264—3)

This invention relates to governors and, more particularly, to governors having a droop characteristic with variation in the governed operating condition of the device associated therewith.

Among the principal objects of this invention are to provide a governor with an improved servo-control mechanism operable to control the droop characteristic of the governor in accordance with changes in the governed operating condition; to provide such a governor servo-control mechanism with means insuring rapid droop controlling response; to provide such a governor servo-control mechanism with means for rapidly adjusting the droop characteristic of the governor in accordance with variations in the governed condition without overtravel or hunting and cyclic variation in the governed condition; to provide such a servo-control which is adaptable to replace manual speeder spring adjustment means in existing governor installations; and to provide such a servo-control which is of a simple, rugged and compact design for economical manufacture, efficient operation, and long operating life.

The foregoing objects are obtained in several illustrative embodiments of the invention by providing a governor with a speed responsive speeder spring seating element having an adjustable servo-control valve spindle thereon which is reciprocable to control the application of hydraulic pressure to a speeder spring seating piston, the piston being reciprocably mounted within a cylinder of the servo-control which is mounted in the governor in place of a manually adjustable spring seating member; the reciprocation of the valve spindle relative to a plurality of fluid ports opening onto a valve bore extending axially of the piston providing rapid, accurate adjustment of the piston to modify the governor droop characteristic in accordance with the variation in the governed condition without overtravel, hunting or cyclic variation in the governed condition.

The invention has particular application in a centrifugal governor of the type shown and described in United States Patent No. 2,836,410, issued to Charles H. Frick and Vernon E. Schafer, and entitled "Governor"; such a governor being adapted to control the fuel supply of an engine in accordance with engine speed and load variations. However, the droop controlling servomechanism of the invention is not limited to engine speed controlling governors of this type, but is applicable to governors generally.

The foregoing and other objects, advantages and features of the invention will become apparent from the following detailed description of several illustrative embodiments thereof having reference to the drawing, in which:

Figure 1 is a sectional view of a portion of an engine governor and fuel controlling mechanism incorporating one embodiment of the invention; and Figure 2 is a sectional view similar to Figure 1 showing a portion of an engine governor and fuel controlling mechanism incorporating a second embodiment of the invention.

Referring more particularly to the drawing, Figure 1 shows an engine governor mechanism having a power shaft 10 adapted to be rotated by a speed-responsive centrifugal assembly, not shown, but similar to that shown and described in the above-identified application. The power shaft 10 is rotatably mounted in a casing 12 by suitable means and is connected through a fuel control linkage mechanism 14 to a speeder spring assembly 16 including one form of a speeder-spring-adjusting droop control servomechanism 17 constructed in accordance with the invention.

A bell crank lever 18 is secured to the upper end of the shaft 10 and is rotated therewith as the shaft is turned by the speed responsive action of the centrifugal assembly. One arm 20 of the bell crank lever carries an adjusting screw 22 which engages one end of a plunger or spring seating element 24 of the speeder spring assembly 17. The element 24 is reciprocably mounted in a flange 26 formed integrally of the casing. A second arm 28 of the lever 18 carries a pin 30 which pivotally mounts a floating differential lever 32 intermediate its ends. One end of the floating lever is pivotally connected by a pin 34 to a link 36 which is connectible to an engine fuel control mechanism, not shown, such as a fuel injector control rack, and the other end of the floating lever has a slot 38 which engages a pin 40 which is adjustable by suitable means, not shown, between an engine "off" or "running" position.

An annular flange 42 is formed on the spring seating plunger 24 and serves as an abutment stop against the flange 26 limiting the movement of the plunger toward the right, as seen in Figure 1, and as a spring seat for one end of a helical speeder spring 44. The speeder spring 44 concentrically embraces the plunger and biases the fuel control linkage 14 in a fuel supply increasing direction, corresponding to movement of the link 36 in the direction of the arrow, in opposition to the fuel supply reducing biasing action of the speed responsive device which tends to rotate the power shaft 10 in a clockwise, fuel-decreasing direction.

The opposite end of the speeder spring 44 is seated against a hydraulically actuated and spring biased piston 46 of the servo-control mechanism 17. The piston 46 is reciprocably mounted in a cylindrical bore 48 extending through a cylinder member 50 which is mounted on the casing 12 by suitable means such as the annular mounting boss 49 and a plurality of bolts 49', only one of which is shown. The cylinder bore 48 is mounted in axial alignment with the plunger 24 and is closed by a head plug 52 at its end remote from the plunger 24. As indicated above, the servo cylinder 50 is preferably designed so that it may be substituted for a manually adjustable speeder spring seat, not shown, of a standard production governor. The piston 46 serves as an adjustable reaction seat for the speeder spring and forms an expansible pressure chamber 60 with the closed end of the bore 48 with a servo compensating speeder spring 62 being interposed between the piston and the head plug 52 within the chamber 60.

The piston 46 has a valve bore 64 extending axially therethrough which is sealed at its end adjacent the chamber 60 by a plug 65. A radial passage or port 66 interconnects the bore 64 with a groove or reduced diameter land 68 formed circumferentially of the piston between annular bosses 70 and 72. The land 68 is of an axial dimension to continuously register with a radial fluid inlet port 74 formed intermediate the ends of the cylinder 50 and connectible through a fitting 76 and a conduit 78 to a suitable fluid pressure source, not shown, such as to the lubricant supply system of the engine. The port 66 supplies fluid to the bore 64 intermediate two lands 80 and 82 of a servo-control valve spindle 84 which is adjustably carried by the spring seating plunger and is reciprocably mounted in bore 64. The land 80 is of a relatively narrow axial dimension which is substantially equal to the bore of a radial port 86 opening onto the piston bore 64. Consequently, a slight movement of the valve spindle 84 in either direction from the port-closed position shown permits fluid to be either supplied to or discharged from the port 86 depending upon whether the spindle is moved to the right or the left, respectively, relative to the piston. It will be noted that the reduced diameter portion of the spindle to the right of the land 80 permits fluid discharged from the port 86 to pass axially into the casing 12 from which it is returned to the crankcase or sump of the engine. It will also be noted that the chamber between the plug 65 and the spindle 84 is relieved by a passage 85 extending axially from that end of the spindle to a point to the right of the land 80.

The port 86 is connected by a passage 88 extending axially of the piston toward the closed end of the cylinder to a radial port or passage 90 opening inwardly onto the bore 64 and outwardly onto a reduced diameter land or groove 91 formed circumferentially of the piston intermediate the boss 72 and a third circumferential boss 92. The groove 91 is of an axial dimension to continuously register with a passage 93 which is formed in the cylinder member and interconnects the groove with the expansible chamber 60; fluid flow through the passage 93 being controllably metered by a needle valve 94.

The port 90 is also connectible to the expansible chamber 60 through a bypass passage 95 extending axially of the piston from its chamber end to a port 96 opening on the bore 64 substantially in the plane of the port 90. The fluid flow between the ports 90 and 96, and therefore through the bypass passage 95, is controlled by the valve spindle 84 which is provided with two relatively narrow port-interconnecting grooves 97 and 98 which are separated by a bypass port closing land 99 and are adapted to relieve and supply hydraulic fluid from or to the chamber depending on the position of the spindle, and thereby the land 80, relative to the port 86. It will be noted that when the land 80 of the valve spindle is closing the port 86, as shown, the bypass opening grooves are substantially equidistant from the plane of the ports 90 and 96 in the embodiment of Figure 1. However, the relative location of the several lands and grooves will necessarily be dependent on the condition controlling response desired in a particular application.

From the foregoing description of the servo-control embodiment of the invention of Figure 1, the operation of the governor will be readily apparent. Assuming that the engine is started, the pin 40 having been set in its engine "running" position, the governed engine speed is achieved as a balance is obtained between the opposing forces acting on the fuel control linkage 14. If the spring seat opposite the plunger 24 were fixed, as with a manually adjustable spring seat, the governor would necessarily have a "positive" droop characteristic. That is, it would effect a decrease in engine speed with an increase in load since the fuel increasing movement of the speeder spring plunger necessary to sustain the additional load would elongate and thereby reduce the speed controlling spring rate at which governed equilibrium would again be obtained. However, with the servo-control mechanism of the invention the force applied by the speeder spring 44 on the plunger 24 is rapidly modified by an increase or decrease in load by the resultant reciprocation of the piston to control the droop characteristics of the governor without overtravel or hunting and without cyclic variation in the governed speed due to extraneous operating conditions, such as engine vibration.

With an increase or decrease in engine load, the speed of the engine is momentarily changed in an inverse relationship. The resultant rotation of the lever 18 by the power shaft 10, in response to these changes in engine speed acting through the centrifugal assembly, causes axial shifting of the plunger 24 and the valve spindle 84. With normal or slight load variations, this movement of the valve spindle relative to the piston 46 serves to control the admission or relief of hydraulic pressure fluid to or from the expansion chamber 60 through the port 86, the passages 88 and 90, the piston groove 91 and the needle valve restricted passage 93. This admission and relief of pressure fluid from the chamber 60 through the passage 93 results in axial movement of the piston 46 at a rate controlled by the setting of the needle valve 94 until the port 86 is again closed by the land 80 thereby preferably maintaining the biasing force which the speeder spring assembly 16 exerts on the plunger substantially constant with the changes in load. The axial movement of the piston 46 also serves to close the inlet or relief port, as the case may be, thereby limiting the movement of the piston.

With larger engine load changes and resultant governor corrective action, the bypass port 96 is connected by either the bypass valve groove 97 or 98 to the port 90 thus bypassing the needle valve control passage 93 to permit the quick transfer of the hydraulic fluid controlling the piston position either from or to, respectively, the expansible chamber 60 through the passage 95. This results in the relatively rapid recovery of the piston 46 to maintain the speeder spring biasing action and, consequently, engine speed. This relatively rapid recovery of the piston is slowed down as the piston approaches its normal position relative to the valve spindle 84 thus closing the bypass port 96 with the valve land 99, and the final adjustment is accomplished by fluid flow through the needle valve control passage 93 until the port 86 is closed by the land 80.

A second form of speeder-spring-adjusting droop control servomechanism, constructed in accordance with the invention, is shown in Figure 2. This servomechanism is quite similar to the embodiment of Figure 1, and in Figure 2 those elements which are identical with those in Figure 1 are designated by the same reference numeral, and those elements which are structurally and functionally similar are identified by the same reference numeral as in Figure 1 plus 100. Thus, the servo-control mechanism in the embodiment of Figure 2 is designated generally by the reference numeral 117.

In this embodiment the servo cylinder 150 is provided with two axially-aligned bores 148a and 148b of different diameter which reciprocably mount corresponding step diameter portions 146a and 146b of a piston member 146. This results in the formation of two expansible chambers 160a and 160b intermediate the radial shoulders formed by the stepped diameter portions of the cylinder and piston and between the small end of the piston 146b and the closed end of the cylinder, respectively. These expansible chambers are interconnected by a passage 193 the flow through which is controlled by an adjustable needle valve 194. A servo compensating speeder spring 162 is interposed in the chamber 160a between the shoulders formed by the stepped cylinder and piston diameters.

With this embodiment, an engine load change and the resultant governor corrective action causes axial shifting of a valve spindle 184. The valve spindle 184 is reciprocably mounted within a valve bore 164 extending axially of the piston 146 from its casing end and is adjustably carried by the speeder spring plunger 24. This movement of the valve spindle relative to the piston serves to admit or relieve hydraulic fluid to or from the expansible chambers through a port 186 as controlled by a land 180 on the spindle. Hydraulic fluid is supplied to the port 186 from a suitable source when the spindle 184 is to the right of the position shown through a conduit 73, a fitting 76, a cylinder inlet port 174, an annular groove 168 formed circumferentially of the piston, a radial port 166 in the piston, and a reduced diameter portion on the spindle intermediate the land 180 and a second land 182. Hydraulic fluid is discharged from the port 186 past a reduced diameter portion on the spindle to the right of the land 180 and into the casing 12 from which it is returned to a suitable sump when the spindle 184 is to the left of the position shown.

The opening of the port 186 by the land 180 permits the flow of hydraulic fluid through a passage 188 and a port 190 to or from the expansible chamber 160a and through the needle valve control passage 193 to the expansible chamber 160b with normal and slight engine load variations. However, with larger engine load changes the movement of the spindle relative to the piston will be such as to interconnect the port 190 with a second port 196 by either of two axially spaced grooves 197 or 198 separated by a land 199 normally effective to close these ports. The interconnection of the ports 190 and 196 by either groove 197 or 198 permits hydraulic fluid to be relieved or supplied directly to the expansible chamber 160b, bypassing the expansible chamber 160a and the metering passage 193.

It will be noted that the bypass passages 95 and 195 in the several embodiments are in parallel with the metering passages 93 and 193, respectively, and thus provide a two stage hydraulic connection between the groove 91 and the expansible chamber 60 and between the expansible chamber 160a and the expansible chamber 160b, respectively. It will also be obvious to those skilled in the art that for a particular application the needle valve controlled passages 93 and 193 might be replaced by providing an orifice of the required size in a plug 100 or 200 closing the axially-extending passage 88 or 188, respectively, within the piston.

From the foregoing description it will be seen that the two illustrative embodiments og the invention each provide a speeder-spring-adjusting droop control servomechanism which is capable of rapid and accurate modification of the governor droop characteristic in accordance with variation in the engine speed and load condition without overtravel and resultant hunting or cyclic variation in the governed condition.

By using the compensating speeder springs 62 and 162 in their respective embodiments, the piston and cylinder may be limited in size since their effective areas need be no larger than necessary to compensate for the loss of rate in the compensating spring as the piston is hydraulically actuated to the right to thereby maintain the biasing action of the main speeder spring relatively constant with application of load. This permits the use of a much more compact servo-control unit. The use of such a compensating spring also permits the governor to be operated as a conventional constant speed governor when the hydraulic fluid pressure is lost for any reason.

While the foregoing description has been confined to two illustrative embodiments of the invention, it will be apparent that numerous modifications can be made therein without departing from the spirit and scope of the invention, as defined in the following claims.

I claim:

1. In a governor mechanism for controlling an operating condition of a device associated therewith, the combination comprising a casing including a cylinder closed at one end, said cylinder having an inlet connectible to a source of pressure fluid, a piston reciprocable within said cylinder and forming an expansible chamber therebetween, said piston having an axial bore, a valve member reciprocable within the bore of said piston, a part drivably connected to said valve and movable within said casing in response to a change in said operating condition, a first spring means reacting between said piston and said part, said first spring means biasing said part in opposition to its movement in one direction in response to a change in said operating condition and biasing said piston away from said part toward the closed end of said cylinder, a second spring means reacting between said piston and the closed end of said cylinder and biasing said piston away from said closed end toward said part, said piston and said valve having normal relative positions when the reaction of said first spring means is at a predetermined value corresponding to a desired level of said operating condition, and means including a first passage in said piston controllable by said valve member in accordance with a relatively small change in the relative positions of the valve and piston to provide a restricted passage interconnecting said inlet and chamber whereby the piston is slowly actuated in accordance with the position of said part to control the biasing force of said spring, and means including said last mentioned means and including a second passage in said piston controllable by said valve member to provide a second passage interconnecting said inlet and chamber in accordance with a relatively larger change in the relative positions of the valve and piston whereby the piston is more rapidly actuated in accordance with the position of said part to control the biasing force of said first spring means.

2. A mechanism for controlling a first operating condition of a device associated therewith, said mechanism comprising, in combination, a cylinder, a piston reciprocable within said cylinder and forming an expansible chamber therebetween, means including a part movable in response to a change in said operating condition, means operatively connected to said part for modifying a controlling second operating condition of said device in accordance with the position of said part, spring means reacting between said piston and said part, said piston and said part having normal relative positions when the reaction of said spring means is at a value corresponding to a given level of said first operating condition, and fluid pressure supply means including a valve member controllable by a relatively small change in the relative positions of the part and piston to provide a restricted passage controlling the application of fluid pressure to said expansible chamber whereby the piston is slowly actuated in accordance with the change of position of said part to control the biasing force of said spring, and means including said last mentioned means and controllable by a relatively larger change in the relative positions of the part and piston to provide a second passage controlling the application of fluid pressure to said expansible chamber whereby the piston is more rapidly actuated in accordance with the position of said part to control the biasing force of said spring means.

3. A mechanism as set forth in claim 2 and including a second spring means reacting through said piston and said first spring means to bias said part in opposition to its condition responsive movement.

4. In a governor mechanism for controlling an operating condition of a device associated therewith and including a first means for controlling said operating condition, a second means responsive to a change in said operating condition and including a part acting on said first means to reduce the change, and spring means biasing said part of said second means to modify its condition responsive action, the combination comprising a cylinder closed at one end, a piston reciprocable within said cylinder and forming an expansible chamber therebetween, said piston forming an adjustable reaction seat for said spring means and being biased thereby toward the closed end of said cylinder, said piston and said part having normal relative positions when the reaction of said spring means is at a desired value corresponding substantially to a desired level of said operating condition, and fluid pressure supply means including a valve member providing a first restricted passage and a second relatively unrestricted passage for controlling the supply of fluid to and from said expansible chamber in accordance with the relative positions of said piston and said part, said valve member being effective to close both said passages when said piston and said part are in their normal relative positions, to open said first restricted passage whenever said piston and part are departed from their normal relative positions, and to open said second passage when the departure of said piston and said part from their normal relative positions has reached a predetermined degree, whereby said piston is rapidly actuated to control the biasing force of said spring when said departure is in excess of said predetermined degree and is actuated at a slower rate intermediate said predetermined degree of departure and said normal relative position of said piston and said part, such actuation of said piston tending to maintain the reaction of said spring means at said desired value thereby tending to maintain said operating conditions constant under all conditions of operation of said device.

5. The combination as set forth in claim 4 and including a second spring means reacting between said piston and the closed end of said cylinder to bias said piston away from said closed end toward said part, the supply of fluid pressure compensating for changes in the rate of said second spring means resulting from actuation of said piston to maintain the reaction of said first spring means at said desired value.

6. A servo-control mechanism for maintaining a first operating condition of a device associated therewith irrespective of other operating conditions imposed simultaneously on said device, said mechanism comprising, in combination, a cylinder member closed at one end, a piston member reciprocable within said cylinder and forming two chambers therebetween, at least one of said chambers being expansible and one of said members having a restricted passage interconnecting said chambers, said piston having an axial bore, a valve member reciprocable within the bore of said piston and having a plurality of axially-spaced reduced diameter lands formed thereon, means including a part drivably connected to said valve and movable in response to a change in said operating condition, means operatively connected to said part for modifying a controlling second operating condition of said device in accordance with the position of said part, a first spring means reacting between said piston and said part and biasing said part in opposition to its condition responsive movement in one direction, a second spring means reacting between said piston and the closed end of said cylinder and biasing said piston away from said closed end toward said part, said piston and said valve having normal relative positions when the reaction of said first spring means on said part is at a predetermined value corresponding to said first operating condition, and fluid inlet and outlet means associated with at least one of said members, and means including passages in said piston controllable by said reduced diameter lands on said valve member to control the supply of fluid to and from the other of said chambers and therefrom through said restricted passage into said one expansible chamber whereby the piston is slowly actuated to maintain the biasing force of said spring in accordance with a relatively small change in the condition responsive position of said part, and means including passages in said piston and controllable by said reduced diameter lands on said valve member upon a substantial change in the condition responsive position of said part to provide a relatively unrestricted passage interconnecting said chambers and bypassing said restricted passage whereby the piston is more rapidly actuated toward recovery of said predetermined biasing reaction of said first spring means.

7. A control mechanism for maintaining an operating condition of a device associated therewith at a constant level irrespective of other operating conditions imposed on said device which would normally tend to change said operating condition, said mechanism including a cylinder member closed at one end, a piston member reciprocably mounted within said cylinder, said members being of stepped diameter and forming two expansible chambers therebetween, one of said members having a restricted passage interconnecting said chambers, one of said members having a relatively unrestricted passage interconnecting said chambers, means for controlling said operating condition of said device, means operatively connected to said first mentioned means and responsive to change in said operating condition, said last mentioned means including a valve member, a spring means reacting between said piston and said valve member and biasing said valve member in opposition to its condition responsively induced movement in one direction, said piston and said valve members having a given positional relationship when the reaction of said spring means is at a predetermined level sufficient to maintain said operating condition at said constant level, and fluid pressure supply means including coacting passages in said members for controlling the flow of actuating fluid to and from one of said expansible chambers and therefrom into the other of said expansible chambers through said restricted passage in response to a change in the relative positions of said valve member and piston members within prescribed limits relative to said given positional relationship and through said unrestricted passage in response to a change in the relative positions of said valve member and piston members in excess of said prescribed limits whereby the piston is actuated to maintain the biasing force of said spring means relatively constant, said actuation being relatively slow when said positional relationship is within said prescribed limits and being relatively rapid when said positional relationship is in excess of said prescribed limits.

8. A servomechanism for controlling an operating condition of an associated mechanism at a constant level including a cylinder member closed at one end, a piston member reciprocably mounted within said cylinder member and forming an expansible chamber therebetween, a means for adjusting said operating condition of said associated mechanism, a condition change responsive means operatively connected to said first means and tending to counteract any change in said operating condition, said last mentioned means including a valve member movable with respect to said other members, a first spring means interposed between said piston and said valve member and a second spring means interposed between said piston member and the closed end of said cylinder member and reacting on said valve member through said piston member and said first spring means, and fluid pressure supply means including coacting passages in said members, said passage being controllable by the relative position of said piston and said valve member to control the flow of actuating fluid to and from said expansible chamber whereby said piston is actuated to maintain the biasing force of said first spring means and thereby said operating condition at a constant level, said actuating fluid as supplied to said expansible chamber compensating for changes in the biasing rate of said second spring means as said piston and valve members are moved relative to said cylinder.

9. In a governor, the combination comprising a cylinder closed at one end and having a fluid pressure inlet, a piston reciprocable within said cylinder and forming an expansible chamber therebetween, said piston having a bore extending axially therethrough, said bore being closed at its end adjacent said chamber and opening on a fluid outlet at its opposite end, said piston having a first passage connecting said inlet with said bore, means including a second passage in said piston for gradually introducing and relieving pressure fluid to and from said chamber, said second passage having two ports opening on said bore in axially-spaced relation to said first passage, means including a third passage in said piston for rapidly introducing and relieving pressure fluid to and from said chamber, said third passage having a port opening on said bore in the plane of one of said ports of said second passage, a valve member reciprocable within said bore and having a plurality of reduced diameter land portions formed thereon, one of said land portions being adapted upon movement of said valve member in one direction to interconnect said inlet port with the other port of said second passage, a second of said land portions being adapted upon further movement in said one direction to interconnect the one port of said second passage and said port of said third passage, a third of said land portions being adapted to connect said other port of said second passage to said outlet upon movement of said valve member in the opposite direction, and a fourth of said land portions being adapted to interconnect the one port of said second passage and said port of said third passage upon further movement of said valve member in said opposite direction, a part movable relative to said cylinder in response to a change in a controllable condition of an associated mechanism, a first spring means interposed between said piston and said part whereby said valve is biased toward said part and the piston is biased toward the closed end of said cylinder, and a second spring means interposed between said piston and said closed end of said cylinder whereby said piston is biased toward said part and said first spring means, said passages being controlled by the relative position of the valve and piston whereby the piston is actuated in accordance with its relative position with respect to said condition responsive part to maintain the bias on said part at a substantially constant level.

10. In a servo-control mechanism, a cylinder closed at one end and having an inlet port connectible to a fluid pressure source, a piston reciprocable within said cylinder, said piston and said cylinder being of stepped diameter and forming at least two expansible chambers therebetween, said piston having a bore extending axially therethrough, said bore being closed at its end adjacent said closed cylinder end and opening on a fluid outlet at its opposite end, said piston having a first passage connecting said inlet with said bore, means including a second passage in said piston for gradually introducing and relieving pressure fluid to and from one of said chambers, said second passage having a first and second port opening on said bore in axially-spaced relation to said first passage and a third port opening on the other of said chambers, means including a third passage in said piston for rapidly introducing and relieving pressure fluid to and from said one chamber, said third passage having a port opening on said bore in the plane of one of said two ports of said second passage, a valve member reciprocable within said bore and having a plurality of reduced diameter land portions formed thereon for controlling the ports opening on said bore, one of said land portions being adapted upon movement of said valve member in one direction to interconnect said inlet port with the other port of said two ports of said second passage, a second of said land portions being adapted upon further movement in said one direction to interconnect said one port of said second passage and said port of said third passage, a third of said land portions being adapted to connect said other port of said second passage to said outlet upon movement of said valve member in the opposite direction, and a fourth of said land portions being adapted to interconnect said one port of said second passage and said port of said third passage upon further movement of said valve member in said opposite direction, a part movable relative to said cylinder in response to changes in a controlled condition of an associated device, a plunger element in thrust relation to said part and connected to said valve member, a first spring means interposed between said piston and said plunger whereby said plunger and valve are biased toward said part and the piston is biased toward the closed end of said cylinder, and a second spring means interposed between said piston and said cylinder in one of said expansible chambers whereby said piston is biased toward said plunger and said first spring means, said passages being controlled by the relative position of the valve and piston whereby the piston is actuated in accordance with its position relative to said condition responsive part to control the bias of said first spring means on said part.

11. A servo-control device comprising, in combination, a means for controlling an operating condition of a mechanism associated with said device, a means responsive to a change of said operating condition and including an element effective to signal any change in said operating condition to said first mentioned means, a means for biasing said element to oppose the condition-responsive signal generated by said condition-responsive means, a means adjustable to vary the biasing action of said element biasing means, means for biasing said adjustable means in opposition to said element biasing means, and means for adjusting said adjustable means in accordance with the positional relationship between said element and said adjustable means, said adjustable means including a member having a normal positional relationship relative to said element when the biasing action imposed on said element by said element biasing means is at a desired value and said adjusting means including means for rapidly adjusting said adjustable means when said positional relationship is out of phase from normal above a predetermined datum and including means for slowly adjusting said adjustable means when said positional relationship is out of phase between said predetermined datum and said normal relationship.

12. In a servo-control mechanism, the combination comprising a first means for controlling an operating condition of a mechanism associated with said device, a second means responsive to a change of said operating condition and including an element effective to signal any change in said operating condition to said first mentioned means, a third means biasing said element to oppose the condition-responsive signal generated by said second means, and adjustable reaction means for varying the biasing action of said third means on said element, means biasing said reaction means in opposition to the biasing action of said third means, and means for adjusting said reaction means in accordance with deviation of the biasing action imposed on said element by said third means from a desired value, said adjusting means including means for rapidly adjusting said reaction means when the differential between the actual biasing action and said desired value is in excess of a predetermined amount and including means for slowly adjusting said reaction means when the differential is between said predetermined amount and said desired value thereby rapidly adjusting said biasing action to said desired value without overtravel whenever any change is effected in said operating condition.

13. In a constant speed governor mechanism for maintaining the speed of an engine associated therewith at a constant level irrespective of variations in the load condition imposed on said engine which would normally tend to change said speed, said mechanism including a cylinder member closed at one end, a piston member reciprocably mounted within said cylinder, said members being of stepped diameter and forming two expansible chambers, one of said members having a restricted passage interconnecting said chambers, one of said members having a relatively unrestricted passage interconnecting said chambers, means for controlling the speed of said engine, means operatively connected to said first mentioned means and movable in response to changes in the engine speed, said last mentioned means including a valve member, spring means reacting between said cylinder and said piston and between said piston and said valve member and biasing said valve member in opposition to its speed responsively induced movement, said piston and said valve members having a given positional relationship when the reaction of said spring means is at a predetermined level sufficient to maintain the engine speed at a desired constant level, and fluid pressure supply means for controlling the flow of actuating fluid to and from one of said expansible chambers and therefrom into the other of said expansible chambers through said restricted passage in response to an engine load change imposed speed variation within prescribed limits and through said unrestricted passage in response to an engine load change imposed speed variation in excess of said prescribed limits whereby the piston is actuated to maintain the biasing force of said spring means on said valve member relatively constant, said actuation being relatively slow when said load imposed speed change is within said prescribed limits and being relatively rapid when said load imposed speed change is in excess of said prescribed limits.

14. Control mechanism for maintaining a given operating condition of a device associated therewith irrespective of other operating conditions imposed simultaneously on said device, said mechanism comprising, in combination, a cylinder member closed at one end, a piston member reciprocable within said cylinder and forming two chambers therebetween, at least one of said chambers being expansible and one of said members having a restricted passage interconnecting said chambers, means including a part movable in response to change in said given operating condition, means for modifying a controlling operating condition of said device in accordance with the position of said part, spring means reacting between said piston and the closed end of said cylinder and between said piston and said part and biasing said part in opposition to a change in said given operating condition in one direction, and means including a valve member for controlling the supply of fluid to and from the other of said chambers and therefrom through said restricted passage into said one expansible chamber whereby the piston is slowly actuated to maintain the biasing force of said spring in accordance with a relatively small departure from a positional relationship between said piston and said part corresponding to a given biasing action on said part corresponding to a given level of said given operating condition, and means including said valve member upon a substantial departure of said part from said positional relationship to provide a relatively unrestricted passage interconnecting said chambers and bypassing said restricted passage whereby the piston is more rapidly actuated toward recovery of said predetermined biasing action of said spring means on said part.

15. A mechanism for maintaining a first operating condition of a device associated therewith at a desired level, said mechanism comprising, in combination, means including a part movable in response to a change in said operating condition, means for modifying a controlling second operating condition of said device in accordance with the position of said part, spring means biasing said part in opposition to its condition responsive movement in one direction, fluid pressure control means for adjusting the biasing action of said spring means, said fluid pressure control means and said part having a normal operational relationship when the reaction of said spring means is at a rate corresponding to the desired level of said operating condition and fluid pressure supply means including a valve member controllable by a relatively small change from said normal reationship to provide a restricted passage controlling the application of fluid pressure to slowly actuate said control means in accordance with the change of position to maintain said rate of said spring, and a second fluid pressure supply means including said last mentioned means and controllable by a relatively larger departure from said normal relationship to provide a second passage controlling the application of fluid pressure to rapidly actuate said control means in accordance with the position of said part to tend to maintain said rate of said spring means substantially constant.

16. A mechanism as set forth in claim 15 and including a second spring means reacting through said control means and said first spring means to bias said part in opposition to its condition responsive movement in one direction, and said fluid pressure supply means actuating said control means to compensate for changes in the rate of said second spring means due to actuation of said control means to maintain the rate of said first spring means substantially constant.

17. A servomechanism for controlling an operating condition of an associated mechanism at a constant level including a fluid actuated means, a means for adjusting said operating condition of said associated mechanism, a condition change responsive means operatively connected to said condition adjusting means and tending to counteract any change in said operating condition, said condition responsive means including a valve member movable to control said fluid actuated means, a first spring means interposed between said fluid actuated means and said valve member and a second spring means acting through said fluid actuated means and said first spring means, and fluid pressure supply means including said valve member for controlling the flow of actuating fluid to and from said fluid actuated means whereby said fluid actuated means is actuated to maintain the biasing force of said first spring means and thereby said operating condition at a constant level, said actuating fluid as supplied to said fluid actuated means compensating for changes in the biasing rate of said second spring means.

18. A control mechanism for maintaining an operating condition of a device associated therewith at a constant level irrespective of other operating conditions imposed on said device which would normally tend to change said operating condition, said mechanism including a cylinder member closed at one end, a piston member reciprocably mounted within said cylinder, at least one of said members being of stepped diameter and said members forming two chambers therebetween, at least one of said chambers intermediate the closed end of the cylinder member and the piston member being an expansible chamber, one of said members having a restricted passage interconnecting said chambers, one of said members having a relatively unrestricted passage interconnecting said chambers, means for controlling said operating condition of said device, means operatively connected to said first mentioned means and responsive to change in said operating condition, said last mentioned means including a valve member, a spring means reacting between said piston and said valve member and biasing said valve member in opposition to its condition responsively induced movement in one direction, said piston and said valve members having a given positional relationship when the reaction of said spring means is at a predetermined level sufficient to maintain said operating condition at said constant level, and fluid pressure supply means including coacting passages in said members for controlling the flow of actuating fluid to and from said one expansible chamber through the other of said chambers and said restricted passage in response to a change in the relative positions of said valve member and piston members within prescribed limits relative to said given positional relationship and through said unrestricted passage in response to a change in the relative positions of said valve member and piston members in excess of said prescribed limits whereby the piston is actuated to maintain the biasing force of said spring means relatively constant, said actuation being relatively slow when said positional relationship is within said prescribed limits and being relatively rapid when said positional relationship is in excess of said prescribed limits.

19. In a governor, the combination comprising a cylinder closed at one end and having a fluid pressure inlet, a piston reciprocable within said cylinder and forming an expansible chamber therebetween, said piston having a bore extending axially therethrough, said bore being closed at its end adjacent said chamber and opening on a fluid outlet at its opposite end, said piston having a first passage connecting said inlet with said bore, means including a second passage in said piston for gradually introducing and relieving pressure fluid to and from said chamber, said second passage having two ports opening on said bore in axially-spaced relation and said first passage, means including a third passage in said piston for rapidly introducing and relieving pressure fluid to and from said chamber, said third passage having a port opening on said bore in the plane of one of said ports of said second passage, a valve member reciprocable within said bore and having a plurality of reduced diameter land portions formed thereon, one of said land portions being adapted upon movement of said valve member in one direction to interconnect said inlet port with the other port of said second passage, a second of said land portions being adapted upon further movement in said one direction to interconnect the one port of said second passage and said port of said third passage, a third of said land portions being adapted to connect said other port of said second passage to said outlet upon movement of said valve member in the opposite direction, and a fourth of said land portions being adapted to interconnect the one port of said second passage and said port of said third passage upon further movement of said valve member in said opposite direction, drive means for reciprocating said valve member including an element operably connected to said valve member and movable relative to said cylinder in response to a change in a controllable condition of an associated mechanism, and spring means interposed between said piston and said valve member whereby said valve member is biased toward said drive element and the piston is biased toward the closed end of said cylinder, said passages being controlled by the relative position of the valve member and piston whereby the piston is actuated in accordance with its relative position with respect to said condition responsive part to maintain the bias on said drive element and means at a substantially constant level.

20. In a servo-control mechanism, a cylinder closed at one end and having an inlet port connectible to a fluid pressure source, a piston reciprocable within said cylinder, said piston and said cylinder being of stepped diameter and forming at least two expansible chambers therebetween, said piston having a bore extending axially therethrough, said bore being closed at its end adjacent said closed cylinder end and opening on a fluid outlet at its opposite end, said piston having a first passage connecting said inlet with said bore, means including a second passage in said piston for gradually introducing and relieving pressure fluid to and from one of said chambers, said second passage having a first and second port opening on said bore in axially-spaced relation to said first passage and a third port opening on the other of said chambers, means including a third passage in said piston for rapidly introducing and relieving pressure fluid to and from said one chamber, said third passage having a port opening on said bore in the plane of one of said two ports of said second passage, a valve member reciprocable within said bore and having a plurality of reduced diameter land portions formed thereon for controlling the ports opening on said bore, one of said land portions being adapted upon movement of said valve member in one direction to interconnect said inlet port with the other port of said two ports of said second passage, a second of said land portions being adapted upon further movement in said one direction to interconnect said one port of said second passage and said port of said third passage, a third of said land portions being adapted to connect said other port of said second passage to said outlet upon movement of said valve member in the opposite direction, and a fourth of said land portions being adapted to interconnect said one port of said second passage and said port of said third passage upon further movement of said valve member in said opposite direction, a part movable relative to said cylinder in response to changes in a controlled condition of an associated device, a plunger element in thrust relation to said part and connected to said valve member, and spring means interposed between said piston and said plunger whereby said plunger and valve are biased toward said part and the piston is biased toward the closed end of said cylinder, said passages being controlled by the relative position of the valve and piston whereby the piston is actuated in accordance with its position relative to said condition responsive part to control the bias of said first spring means on said part.

21. In a constant speed governor mechanism for maintaining the speed of an engine associated therewith at a constant level irrespective of variations in the load condition imposed on said engine which would normally tend to change said speed, said mechanism including a cylinder member closed at one end, a piston member reciprocably mounted within said cylinder and defining an expansible chamber therebetween, one of said members being of stepped diameter and defining a second expansible chamber, one of said members having a restricted passages interconnecting said chambers, one of said members having a relatively unrestricted passage interconnecting said chambers, means for controlling the speed of said engine, means operatively connected to said first mentioned means and movable in response to changes in the engine speed, said last mentioned means including a valve member, spring means reacting between said piston and said valve member and biasing said valve member in opposition to its speed responsively induced movement, said piston and said valve members having a given positional relationship when the reaction of said spring means is at a predetermined level sufficient to maintain the engine speed at a desired constant level, and fluid pressure supply means for controlling the flow of actuating fluid to and from said second chamber and therefrom into said expansible chambers through said restricted passage in response to an engine load change imposed speed variation within prescribed limits and through said unrestricted passage in response to an engine load change imposed speed variation in excess of said prescribed limits whereby the piston is actuated to maintain the biasing force of said spring means on said valve member relatively constant, said actuation being relatively slow when said load imposed speed change is within said prescribed limits and being relatively rapid when said load imposed speed change is in excess of said prescribed limits.

22. In a constant speed governor mechanism for maintaining the speed of an engine associated therewith at a constant level irrespective of variations in the load condition imposed on said engine which would normally tend to change said speed, said mechanism including a cylinder member closed at one end, a piston member reciprocably mounted within said cylinder and defining an expansible chamber therebetween, one of said members having a restricted passage therein connected to said chamber and one of said members having a relatively unrestricted passage therein connected to said chamber, means for controlling the speed of said engine, means operatively connected to said first mentioned means and movable in response to changes in the engine speed, said last mentioned means including a valve member, spring means reacting between said piston and said valve member and biasing said valve member in opposition to its speed responsively induced movement, said piston and said valve members having a given positional relationship when the reaction of said spring means is at a predetermined level sufficient to maintain the engine speed at a desired constant level, and fluid pressure supply means controllable by said valve member to supply actuating fluid to and from said expansible chamber through said restricted passage in response to an engine load change imposed speed variation within prescribed limits and through said unrestricted passage in response to an engine load change imposed speed variation in excess of said prescribed limits whereby the piston is actuated to maintain the biasing force of said spring means on said valve member relatively constant, said actuation being relatively slow when said load imposed speed change is within said prescribed limits and being relatively rapid when said load imposed speed change is in excess of said prescribed limits.

References Cited in the file of this patent

UNITED STATES PATENTS

| | | |
|---|---|---|
| 2,270,100 | Adler et al. | Jan. 13, 1942 |
| 2,373,684 | Holloway | Apr. 17, 1945 |
| 2,647,492 | Puerner | Aug. 4, 1953 |
| 2,691,382 | Frick | Oct. 12, 1954 |
| 2,751,752 | Metcalf | June 26, 1956 |

UNITED STATES PATENT OFFICE
CERTIFICATE OF CORRECTION

Patent No. 2,929,616                                March 22, 1960

William R. Fox

It is hereby certified that error appears in the printed specification of the above numbered patent requiring correction and that the said Letters Patent should read as corrected below.

Column 5, line 42, for "og" read -- of --; column 8, line 54, for "passage" read -- passages --; column 13, line 7, for "and" read -- to --; column 14, line 23, for "passages" read -- passage --.

Signed and sealed this 30th day of August 1960.

(SEAL)
Attest:

ERNEST W. SWIDER                               ROBERT C. WATSON
Attesting Officer                                  Commissioner of Patents